United States Patent

Ballard

Patent Number: 6,111,644
Date of Patent: Aug. 29, 2000

[54] INTERFEROMETER FOR DETECTING AND ANALYZING COHERENT RADIATION

[75] Inventor: Paul T. Ballard, Kettering, Ohio

[73] Assignee: Veridian Engineering, Inc., Alexandria, Va.

[21] Appl. No.: 06/549,645

[22] Filed: Nov. 7, 1983

Related U.S. Application Data

[63] Continuation of application No. 06/224,596, Jan. 28, 1981, abandoned.

[51] Int. Cl.[7] ........................................ G01B 9/02
[52] U.S. Cl. ........................ 356/346; 356/318; 356/353; 356/363
[58] Field of Search .................. 356/318, 346, 356/352, 353, 361, 363

[56] References Cited

U.S. PATENT DOCUMENTS

| | | | |
|---|---|---|---|
| 3,824,018 | 7/1974 | Crane | 356/353 |
| 3,950,103 | 4/1976 | Weinmar | 356/345 |
| 4,170,416 | 10/1979 | Fencil | 356/346 |
| 4,172,663 | 10/1979 | Byer et al. | 356/352 |
| 4,173,442 | 11/1979 | Snyder | 356/346 |
| 4,213,706 | 7/1980 | Hill et al. | 356/353 |
| 4,222,667 | 9/1980 | Layne | 356/346 |
| 4,265,539 | 5/1981 | Gafford | 356/345 |
| 4,304,464 | 12/1981 | Hill et al. | 356/353 |
| 4,310,245 | 1/1982 | Pritchard | 356/345 |

OTHER PUBLICATIONS

Crane, "Laser Detection by Coherence Discrimination", Apr. 1979, pp. 212–217, Opt Engin., vol. 18, #2.
Crane, "The Angle Scanned Interferometers," Apr. 1979, pp. 205–211, Opt. Engin., vol.18, #2.
Steed, "Field Widened Interferometry at . . . (USU)", 1979, pp. 2–13, SPIB, vol. 191, 356/346.
Hartman, "Multisensor Warning Receiver . . . ", May 1979, pp. 79–85, Defense Electronics.

*Primary Examiner*—Nelson Moskowitz
*Attorney, Agent, or Firm*—Steptoe & Johnson LLP

[57] ABSTRACT

Incoming optical radiation is divided into two focused beams with a relatively large amount of delay and shift introduced between the beams. Through the focusing of each of the beams to a different focal point (F1), (F2) a lead is created such that a circular or bull's-eye fringe pattern (60) is formed in a plane of observation (45). The position of the fringe pattern with respect to the output optical axis of the device is a function of the angle (θ) of the incoming coherent radiation with respect to the input optical axis of the device. The spacing of the fringe rings is a function of the frequency of the coherent radiation and the intensity of the fringe pattern is a function of the intensity and coherency of the beam of coherent radiation. The interferometer of the invention has a wide angle of reception and no moving parts.

10 Claims, 4 Drawing Sheets

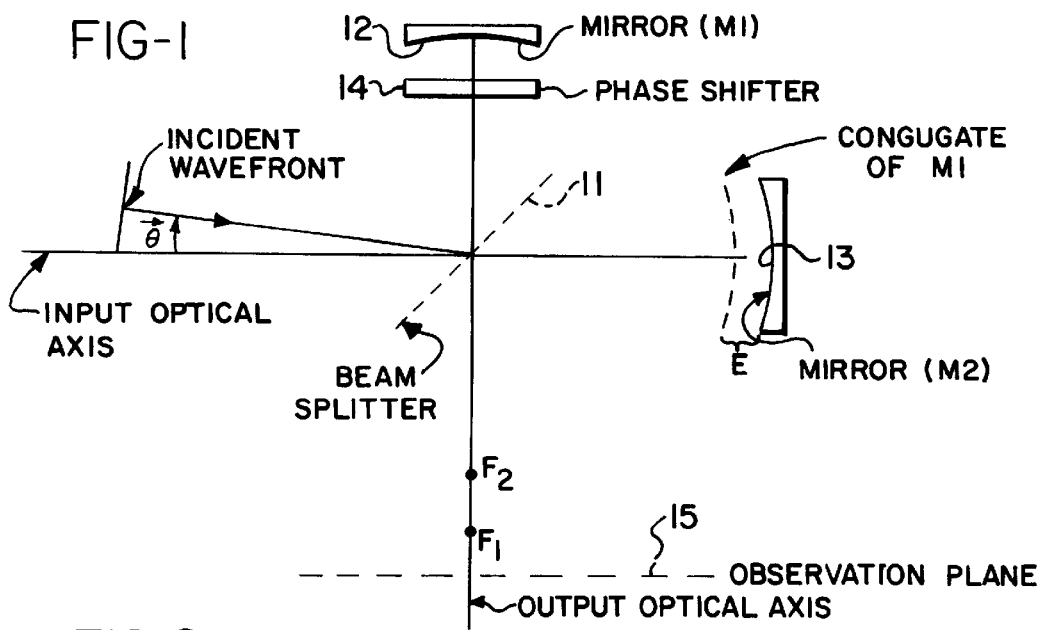
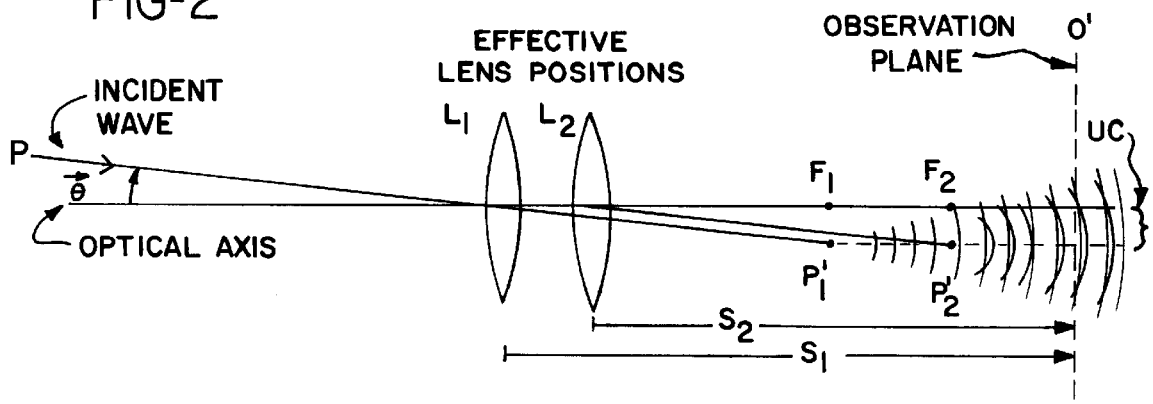
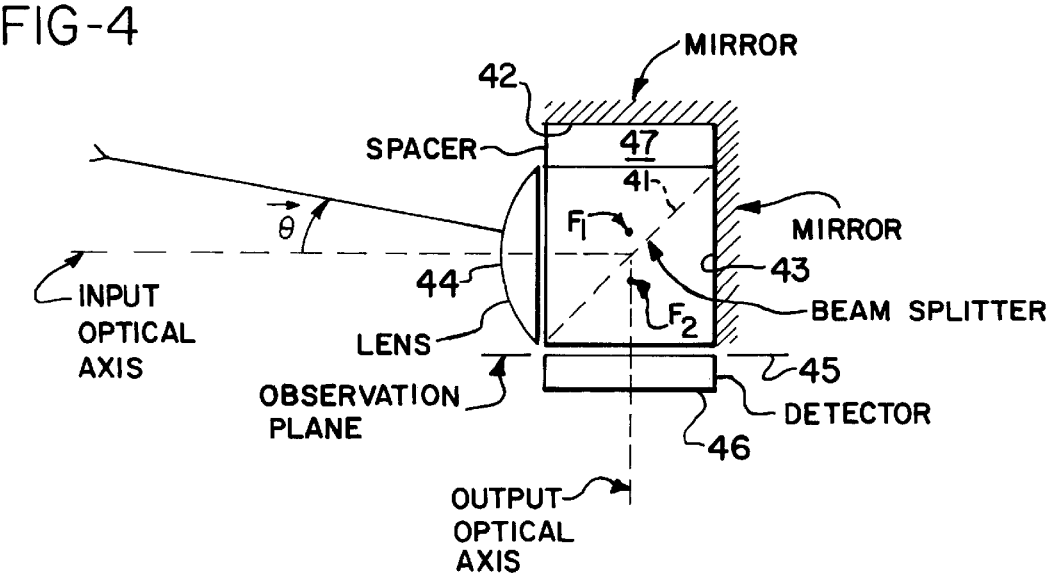

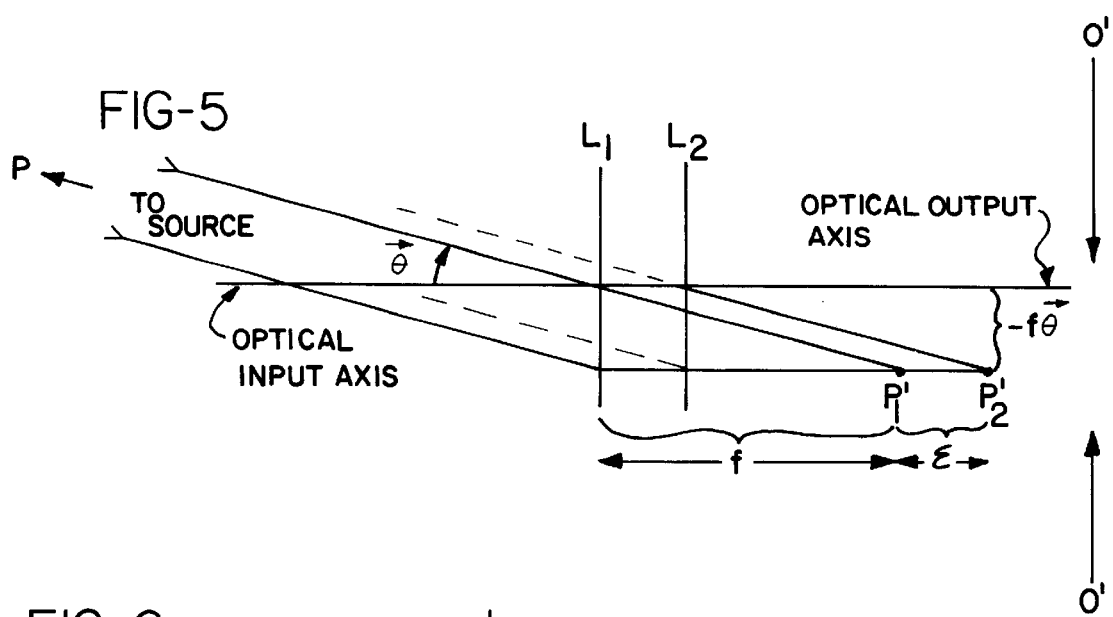
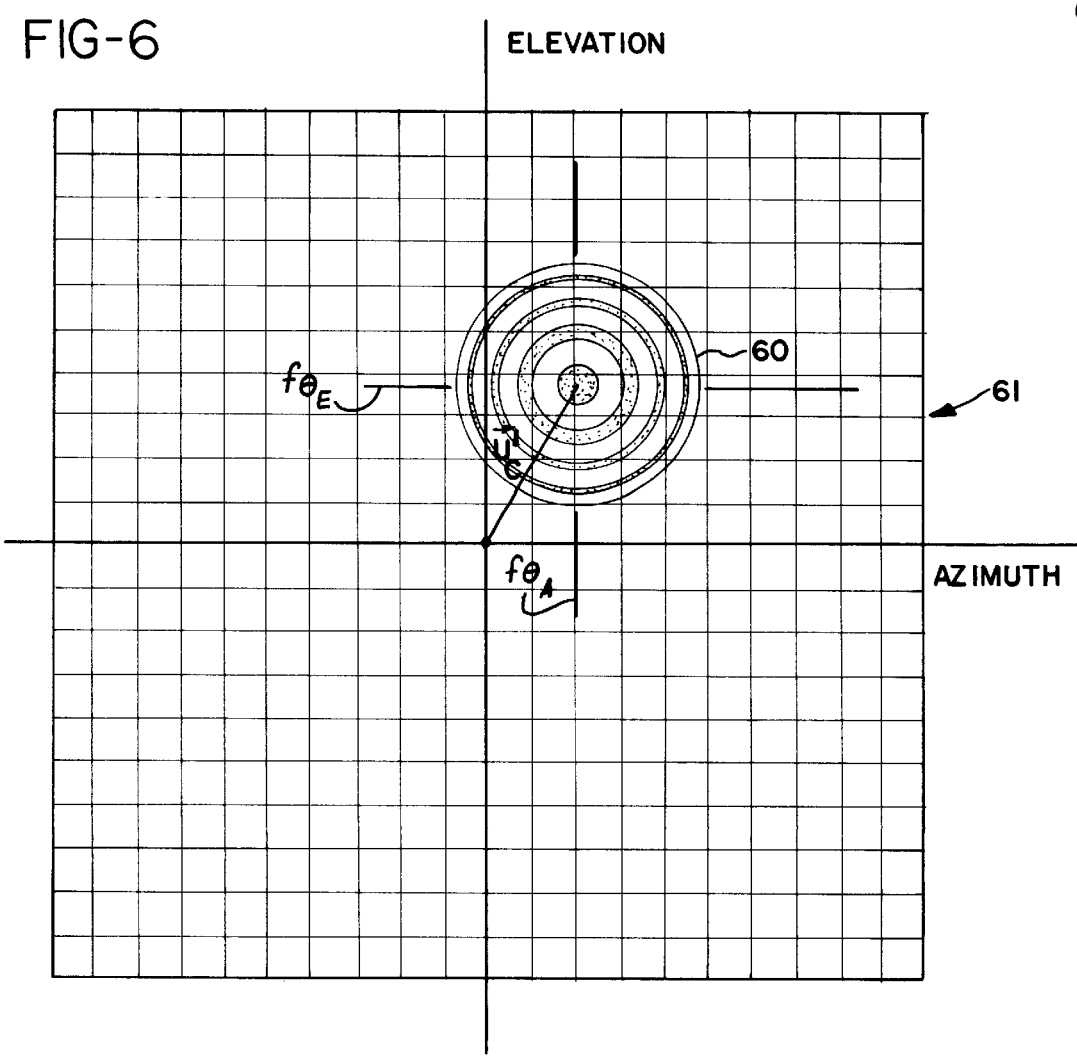

INTERFEROMETER FOR DETECTING AND ANALYZING COHERENT RADIATION

This Application is a continuation of application Ser. No. 06/224,596 filed Jan. 28, 1981, now abandoned.

BACKGROUND OF THE INVENTION

The field of the invention is in the interferometer art and more particularly that of a interferometer-type device for detecting and analyzing coherent radiation (e.g. a laser beam) in the presence of non-coherent radiation.

Interferometers have been known for over one hundred years. Many types of interferometers such as the Michelson, the Fabry-Perot, and the Fizeau have been well developed. Interferometers have been widely used to measure both very small and very large distances and fur the measurement of wavelengths and frequencies. Generally, optical interferometers function through the combining of two separate rays of collimated monochromatic light, phase adjusted by a movable element, to provide a fringe pattern. Before the advent of the laser, the obtaining of sufficiently coherent light for a light source was frequently a problem.

The use of the interferometer to detect and analyze laser emissions is well known. For example, U.S. Pat. No. 4,172,663 to Byer et al discloses a plurality of Fabry-Perot etalon interferometers with the light input to and the light outputs from the etalons, focused by lenses, and sequentially directed onto a spatial detector; while a device having delay, shift, and, lead is disclosed for obtaining the wavelength of laser emissions, the angle of arrival information is not produced. Crane in U.S. Pat. No. 3,824,018 rotates a Fabry-Perot etalon through various angles of incidence perpendicular to the optical axis of the etalon to effect a simultaneous two-dimensional scan of the object space, thus providing directional information of a received laser beam. U.S. Pat. No. 4,173,442 to Snyder teaches the use of a Fizeau-type interferometer wherein "tilt" is introduced and a parallel fringe pattern provided to determine the wavelength of light from a monochromatic source; but again, no information is provided regarding the position or direction of the source.

Richard Hartman in the publication of "Defence Electronics" for May 1979 at pages 79–85 describes a Fabry-Perot sensor with a stepped etalon for detecting laser radiation. U.S. Pat. No. 4,170,416 to Fencil discloses a four-quadrant Fabry-Perot etalon optically modulated by tilting or angularly moving the entire unit to distinguish between coherent and non-coherent sources and to obtain the direction of the coherent sources.

Generally, the prior art devices that will detect, analyze, and indicate direction of a coherent beam in the presence of non-coherent radiation involve a moving element, e.g., scanning in the interferometer. Such devices are not rugged, they are complex to fabricate, frequently subject to blind spots, generally have limited acceptance angles, and are quite expensive.

SUMMARY OF THE INVENTION

The present invention provides a device that will detect and analyze relatively low level coherent (e.g., laser) radiation within a complex optical environment, such as man-made non-coherent light, and natural light such as sunlight, skylight, lightning, etc. The invention is a unique, non-moving interferometer which produces real interference fringes on a two-dimensional array detector in an image plane. Contained within the fringes is information as to the wavelength of the coherent light, its angle of arrival and its modulation characteristics (pulse length and repetition frequency). A conventional microprocessor processes the data from the array detector and displays and/or presents these parameters for further utilization. It is a very compact device, without moving parts, with a higher probability of intercept, (i.e., no blind spots and substantially single photon characterization), and generally a lower false alarm rate (due to utilizing both the temporal and spatial coherencies of laser beams) than the prior art devices.

The invention may be further summarized as follows. The invention has no shear or tilt. It has delay (to discriminate against temporally incoherent sources) and shift (to discriminate against spatially incoherent sources and to facilitate determination of the direction of arrival), and lead (to facilitate measurement of wavelength and direction of arrival).

Delay provides discrimination against waves not having temporal coherency and shift provides discrimination against waves not having spatial coherency. Temporal coherency is that property of the wave to have substantially identical phase characteristics at integral multiples of wavelengths over many wavelengths. Spatial coherence is that property of the wave to maintain substantially identical phase characteristics spatially, or transverse to the wave front. Since laser beams have great temporal and spatial coherency, the novel interferometer of the invention is constructed to have, between the two beams within the interferometer, relatively large magnitudes of both delay and shift.

In the invention, the delay is the difference in the optical path lengths along the optical axis and may be brought about by the introduction of a phase shifting element into one of the paths, or as an essentially incidental consequence of the optical design, or typically (and the generally preferred way) by displacing one of the mirrors away from the beam splitter.

In the invention, shift is brought about by so constructing the optics that, as seen by the source through each leg of the interferometer, the observation plane appears to be at differing distances. This may De typically (and generally preferably) brought about by displacing one of the mirrors away from the beam splitter. It should be remarked that while this is similar to the means by which delay is brought about, this is not necessarily true and either may be introduced independently. The effect of shift is such that for each point in the observation plane the phase shift for a wave emanating from any point in the source plane is a rapidly varying function of that point's position. Thus, for a non-singular collection of source points, i. e., a non-pointlike source, the resulting interference is due to many randomly phased waves and no fringes will be formed.

In the invention, lead is brought about by so constructing the optics that, as seen by the observer through each leg of the interferometer, the source appears to be at differing distances. This may be brought about by imaging the distant source at two (or more) different positions. Preferably, this is accomplished by two essentially identical focusing elements displaced from each other relative to the observation plane. Alternatively, this may be accomplished by two dissimilar focusing elements displaced equally from the observation plane. At the observation plane, the two images thereby produce spherical wavefronts of differing radii of curvature, the interference of which produce concentric interference fringes.

By examination of the intensity distribution within the observation plane and by determination of the location and spacing of the interference fringes, the phase relationship between the interfering wavefronts may be deduced. The instantaneous phase relationship of the interfering wavefronts is a direct function of the wavelength of the interfering light (as well as the location of the focii and observation plane). Thus the wavelength of the laser beam may be ascertained from the constants of the device and the location and spacing of the fringe pattern.

By examination of the intensity distribution within the observation plane and by determination of the location and origin of the interference fringes, the symmetry point of the fringe pattern may be deduced. The concentric interference fringes are formed symmetrically about the line defined by the two images. For the case where said images are formed by two essentially identical focusing elements at slightly different distances from the observation plane, the images are both located relative to the output axis an amount proportional to the angular separation of the source and the input axis magnified by the focal length of the optics. Thus the direction of arrival of the laser beam may be ascertained from the constants of the device and the location of the center of the fringe pattern.

According to one aspect of the present invention, an optical interferometer is provided for detecting, analyzing, and determining the direction of coherent radiation from a source located effectively at infinity by dividing the incoming radiation from the source into two beams, introducing a phase delay between the beams large enough to discriminate between temporally coherent and incoherent sources, introducing a shift between the beams large enough to distinguish between spatially coherent and incoherent sources, introducing a lead between the beams sufficient to produce a distinguishable interference pattern for a coherent source only, and recombining the beams to create interference at a plane of observation, and at a location in the plane of observation according to the location of the source.

It is also an object of the present invention to provide a unique instrument that overcomes the previously stated limitations of the prior art and provide in a single instrument a wide-field device with no moving elements that will simultaneously and substantially instantaneously with the signal, determine and indicate the presence of a laser beam, its angle of arrival (azimuth and elevation), its wavelength, and the modulation characteristics of pulse width and pulse repetition rate, in a background of non-coherent radiation.

It is a further object of the invention to provide a two-beam Michelson type optical interferometer having delay, shift, and lead, for laser detection and analysis that will simultaneously detect and analyze a plurality of concurrently occurring laser beams in a background of non-coherent radiation.

Other objects and advantages of the invention will be apparent from the following description, the accompanying drawings and the appended claims.

BRIEF DESCRIPTION OF THE DRAWINGS

FIG. 1 is a schematic-pictorial diagram of an embodiment of the invention;

FIG. 2 is a schematic diagram of an equivalent optical system illustrating the formation of a concentric ring interference pattern;

FIG. 4 is a schematic block-pictorial diagram of another embodiment of the invention;

FIG. 5 is a schematic diagram of an equivalent optical system for mathematical illustration;

FIG. 6 is a schematic-pictorial diagram illustrating a typical interference pattern super-imposed on an observation grid of a detector array.

DESCRIPTION OF THE PREFERRED EMBODIMENTS

Figure 3:
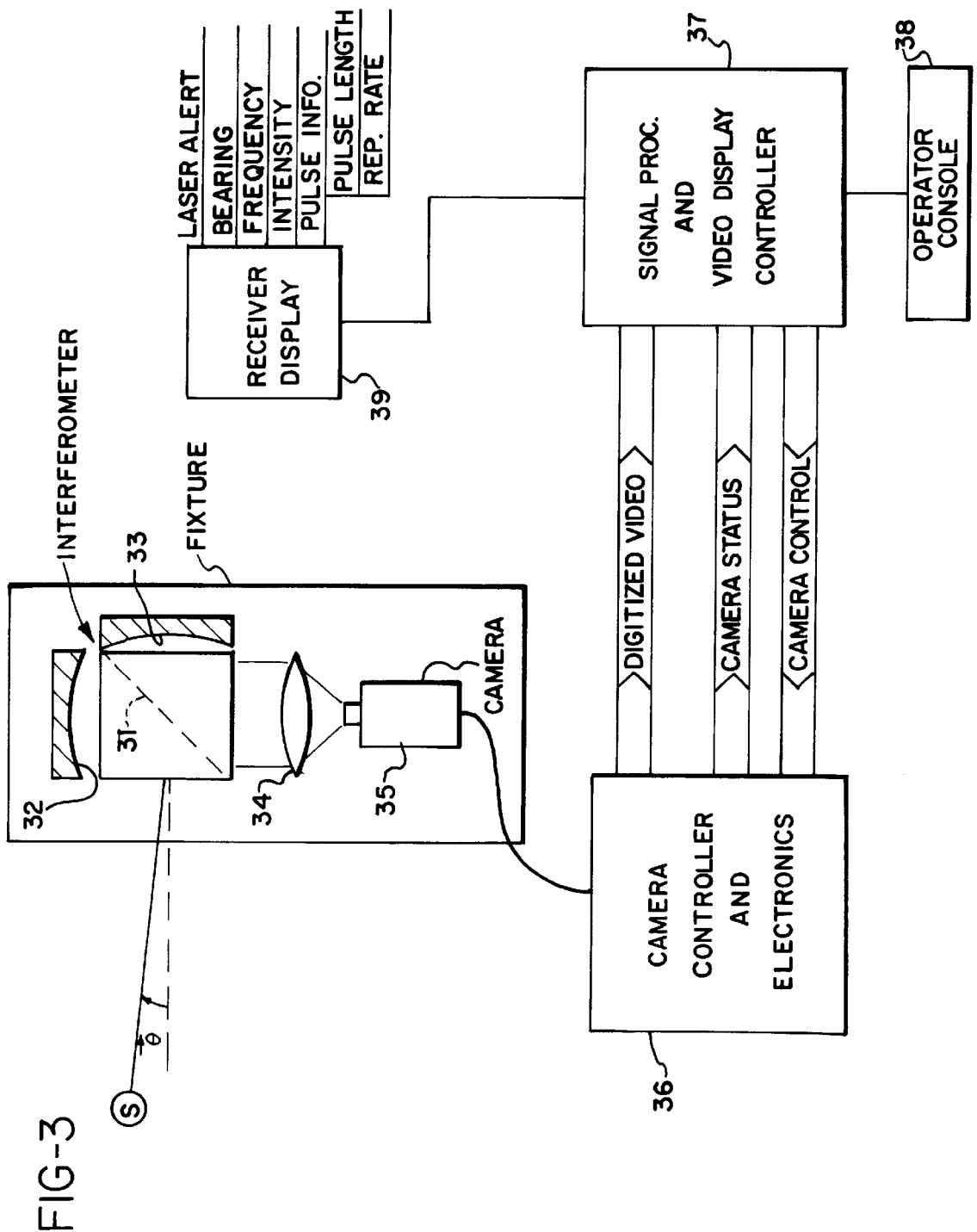
FIG. 3 is a schematic block-pictorial diagram of a typical system for analyzing random incoming optical radiation for coherent beams.

In order to more readily perceive the characteristics of the novel interferometer disclosed herein, it is believed worthwhile to consider, briefly, the theory of two beam (and by extension, multiple beam) interferometry in the general terminology as set forth by W. H. Steel in the text "Interferometry" published by Cambridge University Press (London 1967).

The intensity at some location $\vec{u}'$, in the observation plane is given by $$I(\vec{u}') = I_1 + I_2 + 2(I_1 I_2)^{1/2} Re(\gamma(\vec{u}_1, \vec{u}_2, \tau)). \quad (1)$$

$I_1$ and $I_2$ are the intensities at $\vec{u}'$ due to transmission through paths 1 and 2 respectively. The function, $\gamma(\vec{u}_1, \vec{u}_2, \tau)$ is the Degree of Coherence of the source at the conjugate observation points, $\vec{u}_1$ and $\vec{u}_2$, and is dependent on the properties of both the source and the interferometer.

The source is primarily characterized by its spectral bandwidth, $\Delta v$, and by its effective angular subtense, $\alpha$. The interferometer is primarily characterized by the optical path difference, OPD, that is present between interfering beams. For a given source coordinate, $\vec{x}$, and observation coordinate, $\vec{u}'$, the OPD is parameterized as follows:

$$OPD(\vec{x}, \vec{u}') \simeq p_o - \frac{\vec{s} \cdot \vec{x}}{z} - \frac{h|\vec{x}|^2}{2z^2} - \frac{\vec{t}' \cdot \vec{u}'}{z'} - \frac{l'|u'|^2}{2z'^2} \quad (2)$$

$P_O$ is just the path difference present when $|\vec{x}| = |\vec{u}'| = 0$ and is related to the Delay, $\tau$, by $$p_o = \tau c \quad (3)$$

where c is the speed of light. Also present is a Shear, $\vec{s}$; Shift, h; a Tilt, $\vec{t}'$; and a Lead. The terms z and z' are merely the longitudinal separation of the effective source and observation planes as seen by the observation and source plane, respectively.

Interference fringes of high visibility may be obtained when $$\tau \Delta v \geq 1, \quad (4a)$$

$$\alpha |\vec{s}| \geq \lambda, \quad (4b)$$

$$\alpha^2 |\vec{h}| \geq \lambda, \quad (4c)$$

and $$I_1 = I_2 \quad (4d)$$

thus, for a source with large angular subtense, $\alpha$, and finite spectral bandwidth, $\Delta v$, the Delay, Shear and Shift must be correspondingly small to assure fringe visibility. Progressing to the present invention, since it is desired to detect and analyze coherent radiation, that is radiation for which $\Delta v$ and $\alpha$ are much less than one, it is desirable to deliberately make the Delay and the Shear or Shift to be large. In this way, fringe visibility for incoherent background radiation will be reduced and instead produce a uniform (grey) background, upon which the fringes due to a coherent source will be superimposed.

The characteristics of the fringe pattern are determined by the Tilt and Lead as indicated in Equation 2. If a Tilt, but no Lead, is present, then the observation plane will be crossed by essentially straight fringes. If a Lead, but no Tilt, is present, then the observation plane will contain a series of concentric fringes, such as in a bull's-eye. For a system possessing a Lead, either a Tilt or an off axis angle of arrival will cause the bull's-eye pattern to shift with respect to the output optical axis. As will be discussed shortly, this shift (with respect to the output axis) will be utilized to measure the angle of arrival. No tilt is deliberately introduced into the device.

The word "shift" is used in three major different aspects in this description, and the distinctions should be clearly understood. An element causing a delay in the propagation of a light beam is frequently termed a phase shifter, because the phase of the wave at a given point in space is shifted or delayed (with respect to the phase position it would otherwise have), by the insertion of the phase shifting element. Note, by shifting the phase of one beam derived from a parent beam but not another beam derived from the same parent beam results in one beam being effectively delayed, at a common point in the propagation path, with respect to the other beam. In the terminology of Steel in describing the interferometer characteristics of delay, shear, shift, tilt, and lead, the shift referred to is that difference brought about by the optics of an interferometer wherein the observation plane of the instrument, as seen by the source through each leg of interferometer appears to be at differing distances. The third use of the word shift is to indicate a shifting or positioning of the interference fringing pattern in the observation plane away from the optical axis passing through the plane, in accord with an off axis angle of arrival of the incoming laser beam.

Typical embodiments of the invention are illustrated in schematic-pictorial form in FIGS. 1, 3, and 4. The novel Michelson type interferometer is comprised of a single conventional beam-splitting element 11, 31, and 41 in each of the figures, respectively; two conventional reflecting elements 12–13, 32–33, and 42–43; conventional focusing means which in the embodiments illustrated in FIGS. 1 and 3 are the spherical mirrors 12–13 and 32–33, and in the embodiment of FIG. 4 is lens 44; and conventional means for introducing a phase shift between the two focused beams, which in FIG. 1 is a conventional optical phase shifter 14 and in FIGS. 3 and 4 the phase shift between the focused beams is brought about by spacing one mirror surface further from the beam splitter than the other mirror surface. The phase shifter or spacer creates a delay wherein one beam is delayed with respect to the other. It also provides interferometer shift between the beams. The actual delay is related to the path difference as previously set forth. Since the output of the device is at right angles with the input, it is common practice to refer to an input axis and an output axis, however as shown in FIG. 2, they may be represented by a common single axis.

Fringe patterns created by the invention responsive to laser (or other extremely highly coherent) light sources occur in an observation plane as illustrated at 15 (FIG. 1) and 45 (FIG. 4). While an interference pattern, (as typically illustrated in FIG. 6 by interference fringe pattern 60 on observation plane 61), may be observed manually on a conventional (such as a ground glass) viewing plane, generally it will be detected two dimensionally by a photoelectronic array detector. (Fringes optically Displayed on a viewing plane contain all the analytical information of the coherent radiation source. This information may be obtained manually by an observer.) A conventional diode array detector unit, a conventional video camera tube, or a solid state imaging device such as a General Electric type TN2200 Automation Camera, are examples of suitable array detectors. The type TN2200 microsensor contains an array of 128×128 detector elements with electronics in the camera body to perform analog signal derivation functions. The invention functions equally well for two or more concurrently occurring laser beams, all of which will be simultaneously displayed or analyzed.

The output of the two-dimensional array or camera electronics is conventionally processed to provide the desired parameters. In the embodiment diagrammed in FIG. 3, the fringe pattern is conventionally focused by lens 34 on a conventional camera 35 such as a General Electric type TN2200. Conventional camera controller 36 such as General Electric type PN2110, conventional Signal Processor 37 such as North Star Horizon II, Video Display Controller 38 such as the Matrox ALT 256, and Video Display terminal 39 such as a Sanyo TV Monitor, conventionally display the presence of a laser and its parameters. The Signal Processor 37 is programmed to recognize a concentric ring fringe pattern, extract its location in the observation plane and perform the previously indicated mathematics to provide on the display unit 39 the presence of a laser, its bearing, the frequency of the laser beam and its modulation characteristics such as pulse length and repetition rate. The invention has a wide angle of optical acceptance (typically between 45 to 90 degrees). For wider angles, multiple units are employed, or wide angle "fish eye" optics may be placed between the interferometer and the source.

To further explain by way of example the operation of the invention a specific embodiment will be described in detail. Consider the typical interferometer embodiment illustrated in FIG. 4 and its schematic representations in FIGS. 2 and 5. The interferometer is comprised of a single beam-splitting element 41, two reflecting elements 42 and 43, and a focusing element 44. A conventional two-dimensional array detector 46 is positioned in the observation plane 45 to detect the resultant fringe pattern. A spacer 47 is placed before one of the reflecting elements in order to position it some distance, $\epsilon/2$, from the conjugate image of the second reflecting element. This embodiment, as represented pictorially in FIG. 4, may be schematically represented in its equivalent form in FIGS. 2 and 5, (which should be taken together in the following explanation). The single lens 44 may be replaced with two lenses, $L_1$ and $L_2$, separated by the equivalent distance $\epsilon$ of the spacer 47. Lens $L_1$ has focal length f as does lens $L_2$. The focus of $L_1$ is at $F_1$ and $L_2$ is at $F_2$. Due to the effects of the spacer, and the placement of the observation plane O'—O', the path of the focused wave from $L_1$ is $S_1$ and from $L_2$ is $S_2$. Note that this is representative of the same path difference that prevails from the single lens 44 to observation plane 45 in FIG. 4.

Referring again to FIGS. 2 and 5, light incident on the interferometer from some distant point source P, (note: the effective source of a typical, even nearby, unmodified laser beam, due to its intrinsic characteristics appears to be nearly at infinity), at an angle $\vec{\theta}$, with respect to the optical axis, will be brought to a focus in the vicinity of the optical output axis at two distinct positions, $P_1'$ and $P_2'$. Both images will thus be formed at a distance, $-f\vec{\theta}$, from the optical axis. By choosing the origin of the observation plane to lie on the optical axis, a concentric fringe pattern will be observed whose center is located at a position (see FIG. 6) given by $$\vec{u}_c' = -f\vec{\theta} \tag{5}$$

The intensity distribution is given by $$I = I_o/2(1 + \cos \phi), \tag{6}$$

assuming equal transmission through the two paths.

The phase function, $\phi$, can be shown to be $$\phi = \frac{2\pi}{\lambda}\left[p_o - \Delta p_\theta - \frac{\epsilon}{2z'^2}\left|\vec{u}' - \vec{u}_c'\right|^2\right] \tag{7}$$

by inspection of FIGS. 4 and 5 and straight forward computation.

The first two terms are independent of $\vec{u}'$ and are not of immediate concern. The remaining term describes the spatial dependence of the fringe pattern in the observation plane. From this we may readily determine both the wavelength and the angle of arrival, $\theta$.

The "center" of the fringe pattern has been shown to be located at $\vec{u}' = \vec{u}_c'$. This is related directly to the angle of arrival by Equation (5), when the focal length f of the system is known. The wavelength may be also found directly. The intensity will exhibit minima and maxima whenever the phase function satisfies the relation $$\phi = \frac{m\pi}{2}; m = 1, 3, 5\ldots \tag{8}$$

We may therefore obtain an expression for the location of the "fringes" or intensity extremum $$\left|\vec{u}' - \vec{u}_c'\right|_m^2 = \frac{2z'^2}{\epsilon}\left[\frac{n\lambda}{4} - p_o + \Delta p_\theta\right]. \tag{9}$$

Each fringe represents a different value of n, sometimes called the order of interference. One can readily see that with knowledge of the constants of the interferometer and by measurement of the location of at least two fringes, the wavelength may be determined.

An alternative means of recovering wavelength and angle of arrival information from the interference pattern is suggested by Equation (6) and by the serial line scanned output mode of typical array detectors.

The phase function, $\phi$, possesses a spatial frequency such that to first order it may be written $$\phi = \phi_o = \vec{\omega}_{u'} \cdot \vec{u}' \tag{10}$$

where $$\vec{\omega}_{u'} = \nabla_{u'}\phi \tag{11}$$

Application to equation (7) thus yields $$\vec{\omega}_{u'} = -\frac{2\pi\epsilon}{\lambda z'^2}\left|\vec{u}' - \vec{u}_{c'}\right|\hat{u}' \tag{12}$$

where $\hat{u}'$ represents the unit vector.

Figure 7:
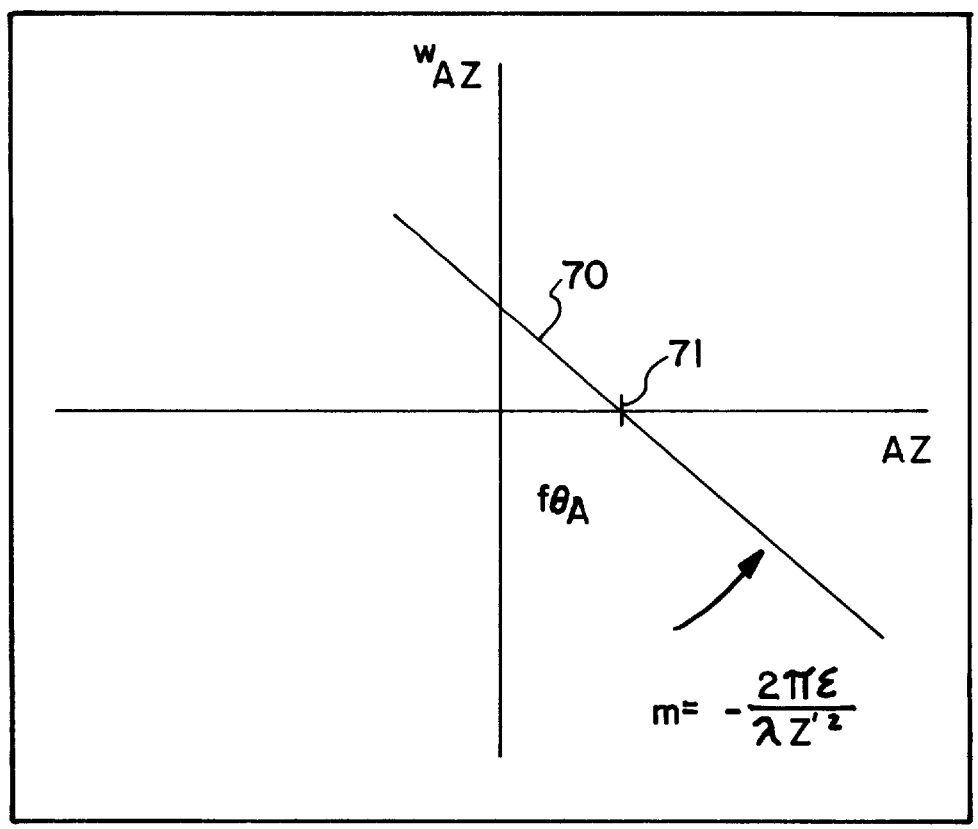
FIG. 7 is a representative plot illustrating a spatial frequency measurement technique for determination of wavelength and angle of arrival.

FIG. 7 illustrates this technique in the azimuthal dimension for the example shown in FIG. 6. By measurement of this spatial frequency (or in the time domain due to the scanned output of the detector) we obtain a linear equation (as graphically represented by line 70) whose intercept 71 yields the angle of arrival of the detected radiation and whose slope m yields the wavelength.

From a practical consideration, for laser detection, the thickness $\epsilon/_2$ of the spacer should be such that light rays not as coherent as typical laser beams will be rejected, i.e., they will not form interference fringe patterns, and yet the spacer should not be so thick that some lasers would also be rejected. (Even laser beams are not absolutely coherent.) Considering present state of the art lasers, the thickness is not critical. A typical and generally preferred spacing or phase shifting means is one that will produce an effective delay or difference between the beams of approximately 0.075 mm.

In a typical embodiment wherein the interferometer comprises a conventional glass cube approximately 25 mm by 25 mm by 25 mm, with the beam splitter in a diagonal plane between two edges, and with reflecting mirrors placed on surfaces adjacent to an edge in which the beam splitter terminates, the two focal points are approximately 0.075 mm apart with the midpoint between them being approximately 12.5 mm from the surface of the cube. In embodiments wherein the focusing is provided by the mirrors, it is desirable (for future ease of calculation, but not a requirement) that the focusing mirrors have the same focal length. In embodiments utilizing a single lens and flat mirrors that is obviously not a concern. Generally, with focusing mirrors, front side reflecting concave mirrors are the preferred mirrors, however, back side reflecting plano-convex mirrors may be used. It is not critical, but generally desirable (again, primarily for future ease of calculation), that the observation plane be perpendicular to the output optical axis. Its location and angle with the axis are not critical, other than it should not be located at either focal point. It has been found that generally it is easier and desirable to locate the observation plane along the output optical axis exterior to the focal points as schematically illustrated in the drawing. Interference between the two beams will exist along their common path anywhere after their recombination, i.e., before, between, and after the focal points. All optics are conventional elements. The medium within the interferometer may be air, however, the generally preferred embodiments are substantially solid glass cubes with the reflecting elements on two adjacent sides, and with a non polarizing beam splitter imbedded in the cube.

While the form of apparatus herein described constitutes a preferred embodiment of this invention, it is to be understood that the invention is not limited thereto, and that changes may be made therein without departing from the scope of the invention.

What is claimed is:

1. A Michelson type optical interferometer having an optical axis for receiving incoming radiation and analyzing and determining the direction with respect to said optical axis of coherent radiation from a source located effectively at infinity without requiring movement of the interferometer comprising:

means including a beam splitter for dividing said incoming radiation into not more than two beams, means for introducing a phase delay between said beams large enough to discriminate between temporally coherent and incoherent sources, means for introducing a shift between said beams large enough to distinguish between spatially coherent and incoherent sources, means for introducing a lead between said beams sufficient to produce a distinguishable interference pattern for a coherent source only, said interferometer having no shear or tilt;

means for defining a plane of observation positioned on said optical axis, and means for recombining said beams to create a fringe ring interference pattern from said source of coherent radiation in said plane of observation, whereby the position of said fringe pattern in said plane of observation with respect to said optical axis is a function of the direction of said coherent source with respect to the said optical axis.

2. An optical interferometer as claimed in claim 1 wherein the said means for introducing a lead between the said beams includes a focusing means having a predetermined focal length, and whereby the said focal length and the spacing of the said fringe ring pattern determine the wave length of the said coherent source and the said focal length and the location of the center of said fringe ring pattern determine the direction of said coherent source with respect to said optical axis.

3. An optical interferometer having an input and an output optical axis for detecting and indicating the direction with respect to said input axis of an incoming beam of coherent radiation without requiring movement of the interferometer comprising:

means including a beam splitter for dividing said incoming radiation into not more than two beams;

means for introducing a phase delay between said beams large enough to discriminate between temporally coherent and incoherent sources;

means for introducing a shift between said beams large enough to distinguish between spatially coherent and incoherent sources;

said interferometer having no shear or tilt;

means including a focusing means having a predetermined focal length, cooperating with said incoming beams for forming said beams into two focused beams providing a first focal point and a second focal point;

means for combining and directing said beams along said output optical axis;

means for defining an observation plane positioned on the said output optical axis; and means cooperating with the said predetermined focal length for sensing the presence, and location with respect to said output axis, of a fringe pattern in said observation plane, whereby the presence, and direction with respect to said input axis, of an incoming beam of coherent radiation are provided.

4. An optical interferometer as claimed in claim 3 wherein said observation plane is substantially perpendicular to said output optical axis and includes a coordinate system having an origin located on the said output optical axis.

5. An optical interferometer as claimed in claim 3 wherein the means providing the said first focal point and the said second focal point is means providing the said focal points with substantially the same focal lengths.

6. An optical interferometer having an input optical axis and an output optical axis, for receiving incoming optical radiation and detecting the presence and direction with respect to the input axis, of a laser beam contained in the incoming radiation without requiring movement of the interferometer comprising:

means for dividing said incoming radiation into a first beam and a second beam;

means for introducing a delay in said first beam;

means for providing a shift between the said first and the said second beam;

said interferometer having no shear or tilt;

means providing a predetermined first focal length for bringing said first beam to a focus at a first focal point in the vicinity of said output optical axis;

means providing a predetermined second focal length for bringing said second beam to a focus at a second focal point in the vicinity of said output optical axis;

means for recombining the said first beam and the said second beam along the said output optical axis; and means cooperating with the said recombined beams for detecting in a plane substantially perpendicular to said output optical axis, the presence of a bull's-eye interference pattern and its location with respect to said output optical axis whereby the presence of a laser beam in the said incoming radiation and its direction with respect to said input optical axis are indicated.

7. An optical interferometer as claimed in claim 6 wherein the said first and second predetermined focal lengths are substantially the same value.

8. An optical interferometer as claimed in claim 6 wherein the said plane of detection perpendicular to the output axis is located on the said output axis exterior the said focal points.

9. An optical interferometer having an input optical axis and an output optical axis, for receiving incoming optical radiation and detecting the presence and direction, with respect to said incoming axis, of a laser beam contained in the said incoming radiation without requiring movement of the interferometer comprising:

a lens having a predetermined focal length positioned on said input optical axis for collecting and focusing said incoming optical radiation into a focused input beam;

a beam splitter positioned on said input optical axis splitting said focused input beam into a first split focused beam and a second split focused beam;

means for introducing a delay in said first split focused beam;

means for providing a shift between the said first beam and the said second beam;

said interferometer having no shear or tilt;

means for combining and directing said delayed first split focused beam and said second split focused beam along said output optical axis providing a focus of said delayed first beam at a first focal point and a focus of said second beam at a spaced apart second focal point;

means defining an observation plane positioned on said output optical axis; and means for detecting a bull's-eye interference pattern and its location in the said observation plane with respect to said output optical axis, whereby said interference pattern indicates the presence of a laser beam in said incoming radiation and the location of said interference pattern and the said focal length of the lens are functions of the direction of said laser beam with respect to said input optical axis.

10. An optical interferometer as claimed in claim 9 wherein the said observation plane is perpendicular to the output optical axis and is located exterior to said focal points.

* * * * *